US011992969B2

(12) United States Patent
Datema

(10) Patent No.: US 11,992,969 B2
(45) Date of Patent: May 28, 2024

(54) MIXER AUTONOMY MODE

(71) Applicant: Oshkosh Corporation, Oshkosh, WI (US)

(72) Inventor: Bryan Datema, Rochester, MN (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 17/745,243

(22) Filed: May 16, 2022

(65) Prior Publication Data

US 2022/0388199 A1 Dec. 8, 2022

Related U.S. Application Data

(60) Provisional application No. 63/197,162, filed on Jun. 4, 2021.

(51) Int. Cl.
*B28C 5/42* (2006.01)
*B28C 5/18* (2006.01)

(52) U.S. Cl.
CPC .......... *B28C 5/4206* (2013.01); *B28C 5/1825* (2013.01)

(58) Field of Classification Search
CPC .................................................... B28C 5/4206
USPC ............................................................ 366/44
See application file for complete search history.

(56) References Cited

U.S. PATENT DOCUMENTS 2,729,435 A * 1/1956 Harbers ................ B28C 5/4213 180/324
4,154,534 A * 5/1979 Lawrence ............. B28C 5/4234 366/44
9,612,655 B2 * 4/2017 Mueller ................. B60K 37/06
2008/0205188 A1 8/2008 Lindblom et al.
2008/0279036 A1 11/2008 Frey et al.
2009/0050438 A1 2/2009 Gillmore et al.
2009/0050439 A1 2/2009 Gillmore et al.
2009/0154287 A1 6/2009 Lindblom et al.

(Continued)

FOREIGN PATENT DOCUMENTS

CN 110426508 A 11/2019
WO WO-2008/157690 A2 12/2008
WO WO-2017/218935 A1 12/2017

OTHER PUBLICATIONS

International Search Report and Written Opinion issued in connection with PCT Appl. No. PCT/US2022/029423, dated Aug. 31, 2022, 14 pps.

*Primary Examiner* — David L Sorkin
(74) *Attorney, Agent, or Firm* — Foley & Lardner LLP

(57) ABSTRACT

A mixer vehicle system includes a mixer vehicle and an autonomous control system. The mixer vehicle includes a chassis and a vehicle body. The vehicle body includes a plurality of subcomponents including a cabin, a mixing drum, a charge hopper, and a chute. The autonomous control system is configured to automate an operation of the mixer vehicle. The autonomous control system includes a sensor and a controller. The sensor is configured to detect an event and generate a signal. The controller is configured to receive the signal and generate an output. The output includes the operation of the mixer vehicle. The operation of the mixer vehicle includes at least one of: (i) moving at least one of the plurality of subcomponents to a desired position; (ii) activating or deactivating at least one mode of operation; and (iii) providing an alert to an operator of the mixer vehicle.

10 Claims, 5 Drawing Sheets

(56) References Cited

U.S. PATENT DOCUMENTS

| | | | | |
|---|---|---|---|---|
| 2010/0295773 | A1 | 11/2010 | Alameh et al. | |
| 2013/0107656 | A1 | 5/2013 | Datema et al. | |
| 2014/0269145 | A1* | 9/2014 | Fasana | B28C 5/4237 366/41 |
| 2015/0159564 | A1 | 6/2015 | Wildgrube et al. | |
| 2015/0246331 | A1* | 9/2015 | Broker | B28C 5/421 366/60 |
| 2015/0301591 | A1* | 10/2015 | Mueller | B60K 35/00 345/156 |
| 2017/0080600 | A1 | 3/2017 | Dickerman et al. | |
| 2017/0297425 | A1 | 10/2017 | Wildgrube et al. | |
| 2017/0361491 | A1 | 12/2017 | Datema et al. | |
| 2017/0361492 | A1 | 12/2017 | Datema et al. | |
| 2019/0091890 | A1 | 3/2019 | Rocholl et al. | |
| 2019/0121353 | A1 | 4/2019 | Datema et al. | |
| 2019/0344475 | A1 | 11/2019 | Datema et al. | |
| 2019/0352096 | A1 | 11/2019 | Mcneilus et al. | |
| 2020/0078986 | A1 | 3/2020 | Clifton et al. | |
| 2020/0094671 | A1 | 3/2020 | Wildgrube et al. | |
| 2020/0230841 | A1 | 7/2020 | Datema et al. | |
| 2020/0230842 | A1 | 7/2020 | Datema et al. | |
| 2021/0039719 | A1 | 2/2021 | Datema et al. | |
| 2021/0069934 | A1 | 3/2021 | Rocholl et al. | |
| 2021/0124347 | A1 | 4/2021 | Datema et al. | |
| 2021/0162630 | A1 | 6/2021 | Clifton et al. | |
| 2021/0213642 | A1 | 7/2021 | Datema et al. | |
| 2021/0229320 | A1 | 7/2021 | Datema et al. | |
| 2021/0229321 | A1 | 7/2021 | Datema et al. | |
| 2021/0237311 | A1 | 8/2021 | Datema | |
| 2021/0237312 | A1 | 8/2021 | Datema et al. | |
| 2021/0252969 | A1 | 8/2021 | Wildgrube et al. | |
| 2021/0276222 | A1 | 9/2021 | Datema | |
| 2021/0345062 | A1 | 11/2021 | Koga et al. | |
| 2021/0394394 | A1 | 12/2021 | Datema et al. | |
| 2022/0162004 | A1 | 5/2022 | Datema et al. | |

* cited by examiner

MIXER AUTONOMY MODE

CROSS-REFERENCE TO RELATED PATENT APPLICATIONS

This application claims priority from U.S. Provisional Application No. 63/197,162, filed Jun. 4, 2021, incorporated herein by reference in its entirety.

BACKGROUND

The present disclosure relates generally to a mode of operation of a mixer vehicle. More specifically, the present disclosure relates to an autonomous mode of operation of a mixer vehicle requiring various amounts of control by an operator to perform certain tasks.

SUMMARY OF THE INVENTION

One exemplary embodiment of the invention relates to a mixer vehicle system including a mixer vehicle and an autonomous control system. The mixer vehicle includes a chassis supporting a plurality of wheels. The mixer vehicle includes a vehicle body supported by the chassis. The vehicle body includes a plurality of subcomponents. The plurality of subcomponents includes a cabin, a mixing drum, a charge hopper, and a chute. The cabin is configured to house one or more operators of the mixer vehicle. The mixing drum defines an aperture and an internal volume. The mixing drum is movable relative to the chassis to agitate mixture ingredients stored in the mixing drum. The charge hopper is positioned proximate the aperture. The charge hopper is movable relative to the aperture. The chute is positioned proximate the aperture and beneath the charge hopper. The chute is pivotally coupled to the mixer vehicle. The autonomous control system is configured to automate at least one operation of the mixer vehicle. The autonomous control system includes a sensor and a controller. The sensor is coupled to the mixer vehicle. The sensor is configured to detect an event and generate an input signal indicating the event. The controller is communicably coupled with the sensor. The controller is configured to receive the input signal generated by the sensor and generate an output responsive to receipt of the input signal. The output includes the at least one operation of the mixer vehicle. The at least one operation of the mixer vehicle includes at least one of: (i) moving at least one of the plurality of subcomponents of the mixer vehicle to a desired position; (ii) activating or deactivating at least one mode of operation of the mixer vehicle; and (iii) providing an alert to an operator of the mixer vehicle.

Another exemplary embodiment relates to a method of automating an operation of a mixer vehicle. The method includes detecting, by an autonomous control system, an event. The method includes comparing, by the autonomous control system, the event with a threshold. The method includes generating, by the autonomous control system, an output corresponding to the threshold. The event matches the threshold. The output includes at least one of: (i) moving at least one of a plurality of subcomponents of the mixer vehicle to a desired position; (ii) activating or deactivating at least one mode of operation of the mixer vehicle; and (iii) providing an alert to an operator of the mixer vehicle.

DETAILED DESCRIPTION

Figure 1A:
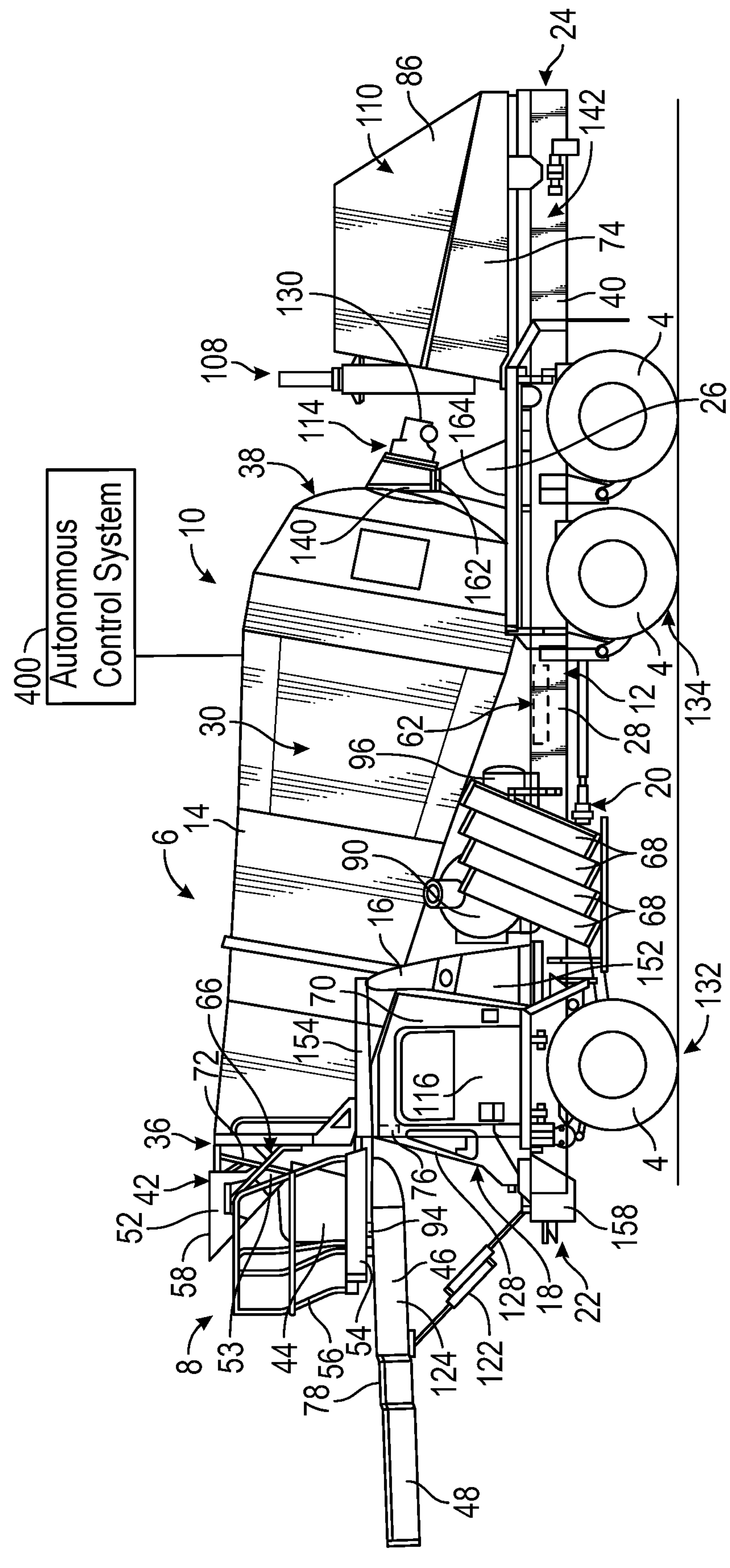
FIG. 1A is a side view of a mixer truck, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Manufacturers and operators of mixer vehicles (e.g., concrete mixers) can employ embodiments of the system disclosed herein to operate such vehicles to improve efficiency and performance. The system can include sensors and controllers to autonomously engage certain components of the mixer vehicle based on certain inputs. For example, the mixer vehicle can engage (or disengage) a component based on the location of the mixer vehicle, the behavior of the mixer vehicle, or hand gestures made by an operator, among others. The autonomous mode of operation reduces the tasks that the vehicle operators need to perform manually, increasing efficiency and minimizing opportunities for mistakes. For example, the system can be configured to automatically activate an auto-load mode of the mixer vehicle when the mixer vehicle is at a specific location (e.g., a concrete plant). The location of the mixer vehicle can be determined by a global positioning system (GPS) or other locating mechanism, and when it is determined that the mixing truck is at the concrete plant, the components needed for loading concrete (or other mixture ingredients) into the mixing truck can be automatically activated, deactivated, or moved to an appropriate position. The system can also provide alerts to the operator indicating activation of a different mode of operation or showing progress of a current task being performed. For example, the system can turn off lights or sound an alarm as it enters a different mode of operation or different lights can indicate progress of a task and indicate to the operator when it is safe to enter the mixer vehicle.

The level of autonomy of the system can be adjusted based on the situation. For example, the system can be configured to be fully autonomous when activating a mixing drum of the mixer vehicle. The system can be configured to automatically begin rotation of the mixing drum at a predetermined speed once a certain threshold is met (e.g., weight, volume, time). In another example, the system can be configured to be partially autonomous when activating the mixing drum. The system can be configured to turn on a light when a certain threshold is met, but then require an action of the operator (e.g., press a button) for the mixing drum to begin rotating at the predetermined speed. The system can also be shut off (e.g., can be completely turned off or can still make detections, but cannot take any action) in in scenarios where autonomy is not appropriate, and manual operation of the vehicle is desired. The activation or deactivation of the autonomy can be autonomous as well (e.g., based on location or behavior of the vehicle).

Figure 1B:
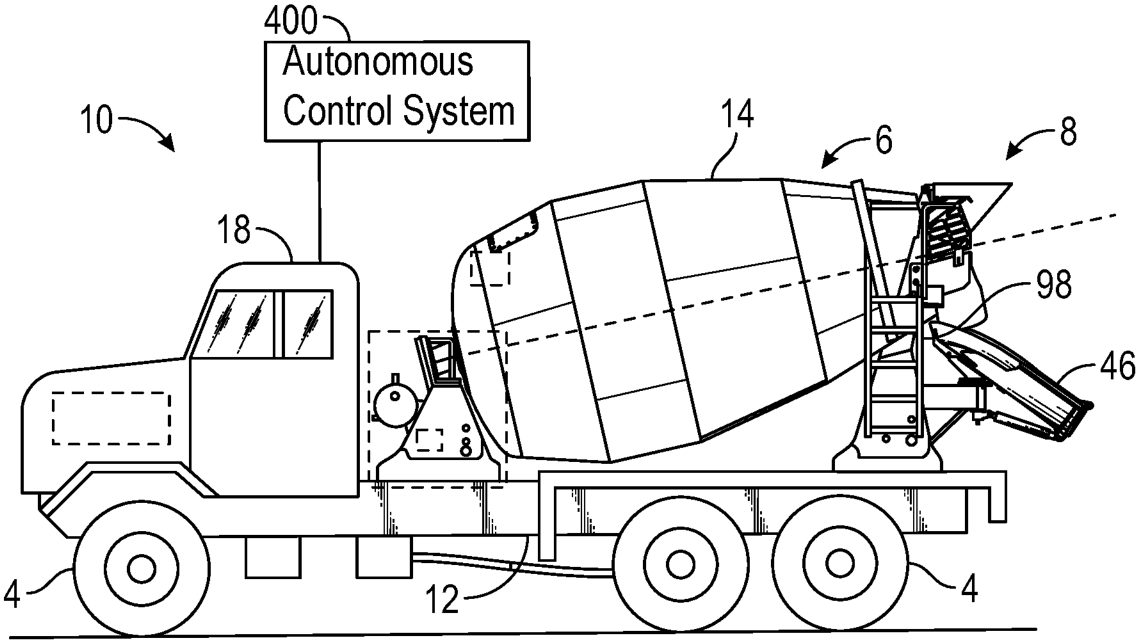
FIG. 1B is a side view of a mixer truck, according to an exemplary embodiment.
Figure 1C:
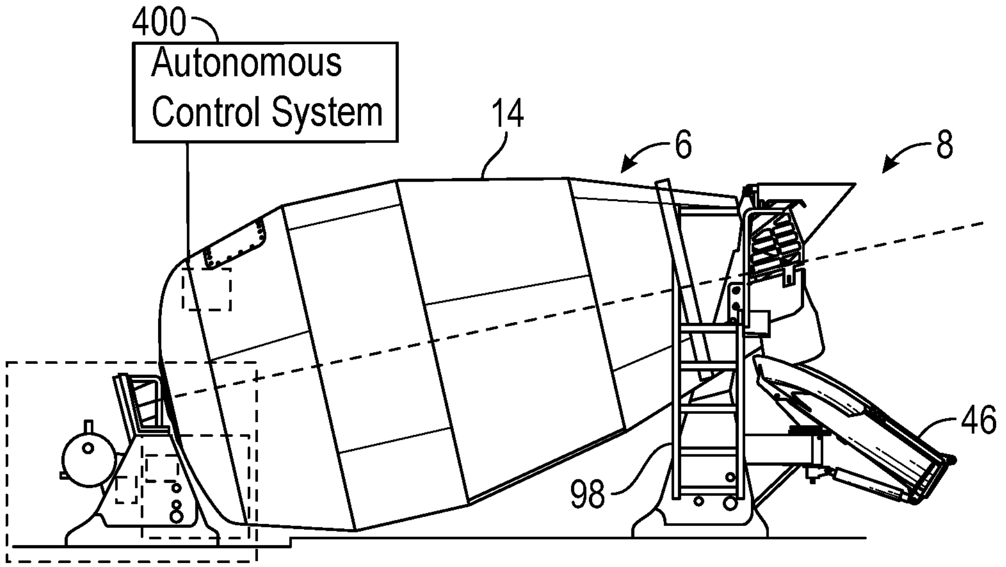
FIG. 1C is a side view of a drum assembly of a mixer truck, according to an exemplary embodiment.
Figure 2:
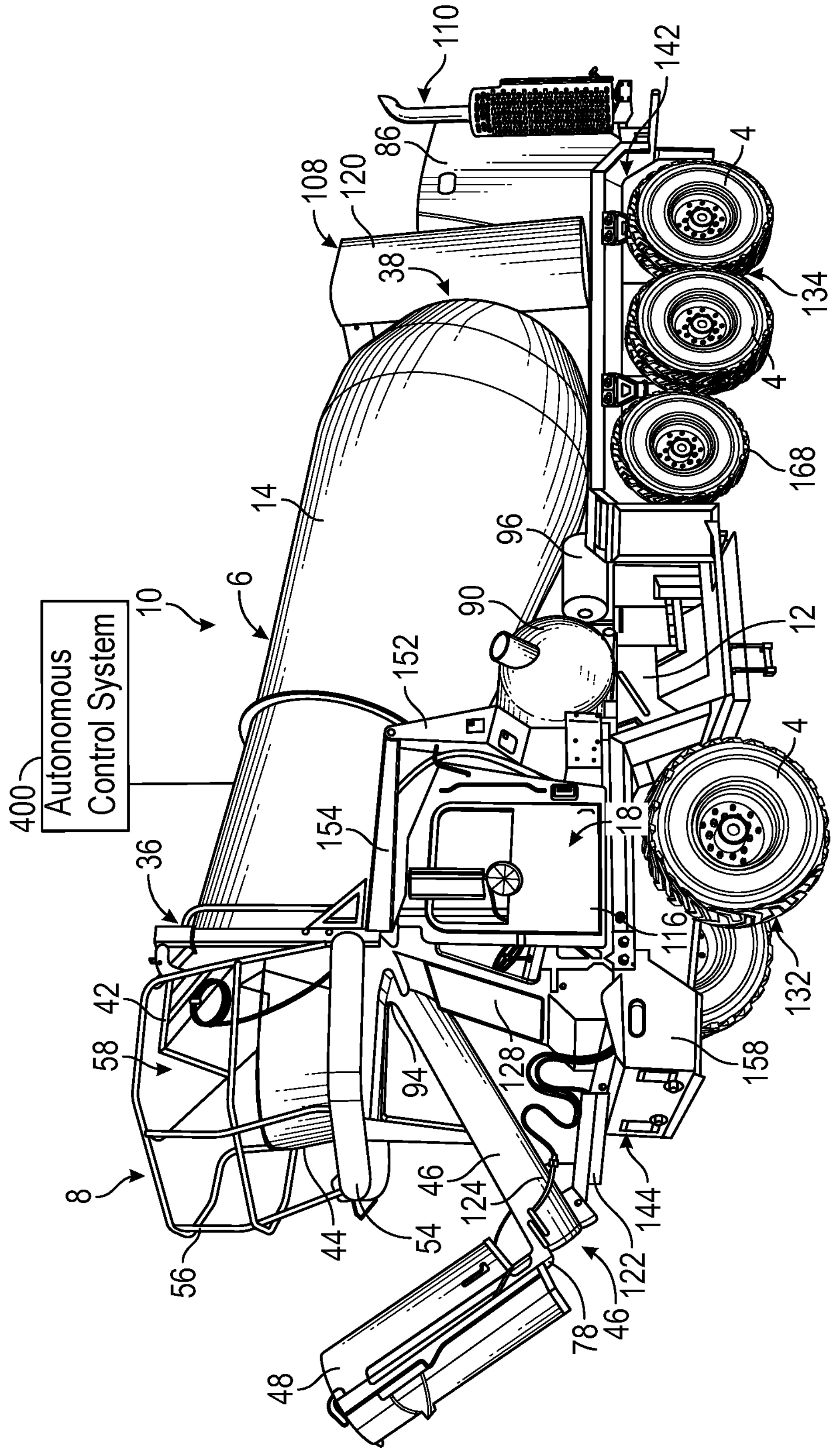
FIG. 2 is a front perspective view of the mixer truck of FIG. 1A, according to an exemplary embodiment.
Figure 3:
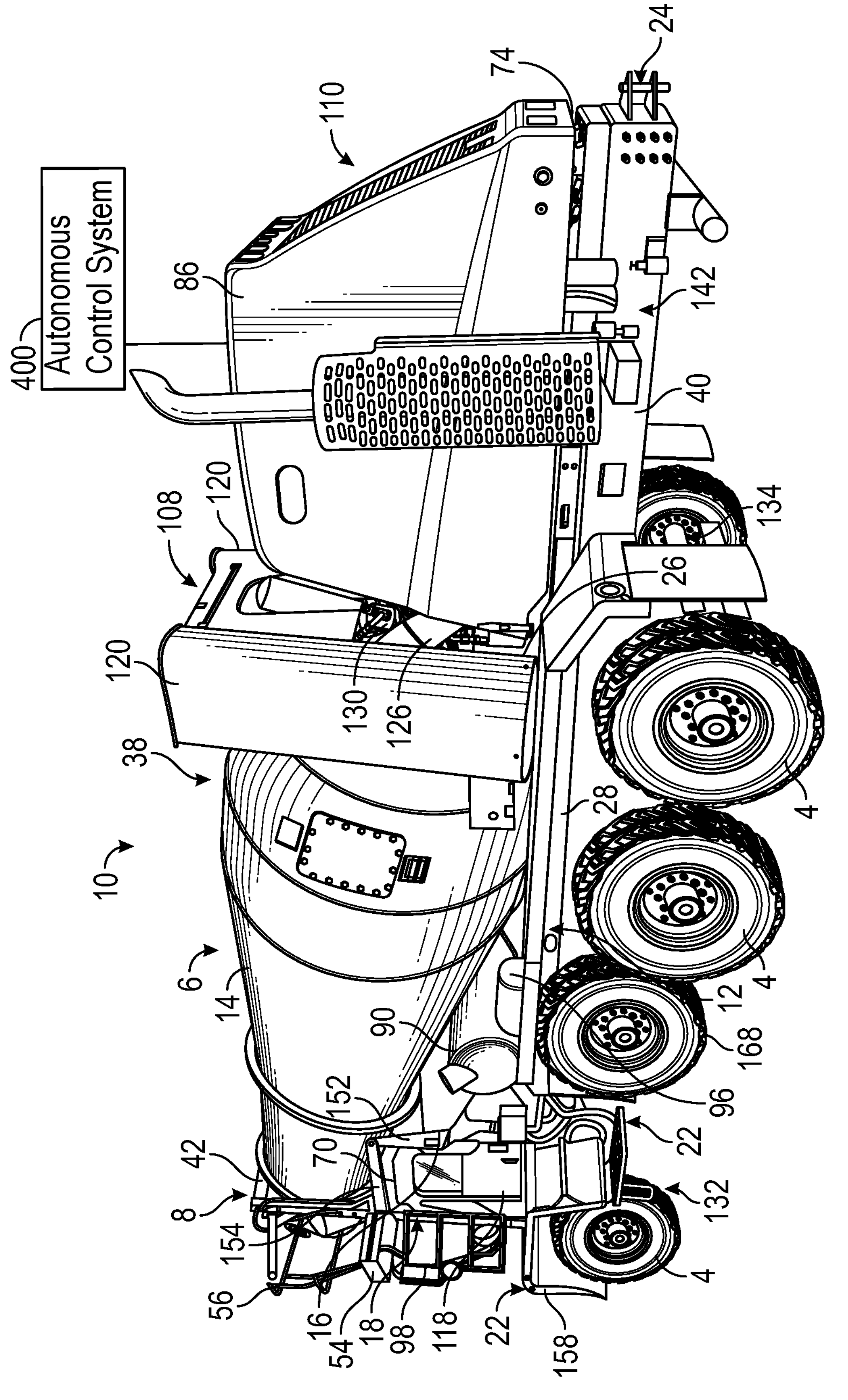
FIG. 3 is a rear perspective view of the mixer truck of FIG. 1A, according to an exemplary embodiment.

Referring to FIGS. 1-3, a conventional mixer truck, shown as mixer vehicle 10, is shown, according to an exemplary embodiment. The mixer vehicle 10, can be configured to transport concrete from a loading location (e.g., a batching plant, etc.) to a point of use (e.g., a worksite, a construction site, etc.). In some embodiments, as shown in FIGS. 1A and 2-3, the mixer vehicle 10 can be a front discharge concrete mixer vehicle. In other embodiments, as shown in FIGS. 1B-1C, the mixer vehicle 10 can be a rear discharge concrete mixer vehicle. The mixer vehicle 10 can include a chassis 12, a drum assembly 6, a hopper assembly 8, a drive system 20, a fuel system 108, and an engine module 110, each of which can include further subcomponents. The mixer vehicle 10 can include various additional engine, transmission, drive, electronic, tractive assembly, braking, steering and/or suspension systems, and hydraulic systems that are configured to support the various components of the mixer vehicle 10. Generally, the chassis 12 can support a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 can be configured to facilitate receiving, mixing, transporting, and delivering concrete to a job site via the mixer vehicle 10.

The chassis 12 can include a frame 28 that extends from a front end 22 to a rear end 24 of the mixer vehicle 10. Wheels 4 can be coupled to the frame 28 and moveably support the frame 28 above a ground surface or road. The wheels 4 can be replaced by other ground engaging motive members, such as tracks. In some embodiments, the chassis 12 can include hydraulic components (e.g., valves, filters, pipes, hoses, etc.) coupled thereto that facilitate operation and control of a hydraulic circuit including a drum drive pump and/or an accessory pump. The frame 28 can provide a structural base for supporting the mixing drum 14, the front pedestal 16, the rear pedestal 26, the cab 18, and the engine module 110. In some embodiments, the frame 28 can include a widened front portion that extends over and about the wheels 4 positioned at the front end 22 of the chassis 12 to simultaneously support the cab 18 and serve as a fender for the wheels 4 positioned at the front end 22 of the chassis 12. The frame 28 can include lift eyes or other structures that facilitates lifting along the chassis 12 such that the chassis 12 can be manipulated as a subassembly for assembly and/or maintenance of the mixer vehicle 10. One or more components can be coupled to the chassis 12 using isolating mounts made of a complaint material, such as rubber. The isolating mounts can be configured to reduce the transfer of vibrations between the components and the chassis 12.

The frame 28 can include a pair of frame rails 40 coupled with intermediate cross members, according to an exemplary embodiment. The frame rails 40 can extend in a generally-horizontal and longitudinal direction (e.g., extend within 10 degrees of perpendicular relative to a vertical direction, extend within ten degrees of parallel relative to a ground surface when mixer vehicle 10 is positioned on flat ground, etc.) between the front end 22 and the rear end 24. The frame rails 40 can be elongated "C-channels" or tubular members, according to various exemplary embodiments. In other embodiments, the frame rails 40 can include another type of structural element (e.g., monocoque, a hull, etc.). In still other embodiments, the frame rails 40 can include a combination of elongated C-channels, tubular members, a monocoque element, and/or a hull element. A first frame rail 40 can be disposed along a first lateral side 142 and a second frame rail 40 can be disposed along a second lateral side 144, respectively, of the mixer vehicle 10. By way of example, the first lateral side 142 of the chassis 12 can be the left side of the mixer vehicle 10 (e.g., when an operator is sitting in the cab 18 and positioned to drive the concrete mixer vehicle 10, etc.) and the second lateral side 144 of the chassis 12 can be the right side of the mixer vehicle 10 (e.g., when an operator is sitting in the cab 18 and positioned to drive the concrete mixer vehicle 10, etc.).

The cab 18 can be coupled to the frame rails 40 proximate the front end 22 of the chassis 12. According to various embodiments, the cab 18 (e.g., operator cabin, front cabin, etc.) can be configured to house one or more operators during operation of the mixer vehicle 10 (e.g., when driving, when dispensing concrete, etc.), and can include various components that facilitate operation and occupancy of the mixer vehicle 10 (e.g., one or more seats, a steering wheel, control panels, screens, joysticks, buttons, accelerator, brake, gear lever, etc.). The cab 18 can include a housing 70 that forms the structure of the cab 18. At least one door 116 can be affixed to the housing 70 to allow an operator to enter and exit the cab 18. A windshield 128 can be disposed along a front side of the housing 70, near the front end and above a front bumper 158 of the mixer vehicle 10. The windshield 128 can be configured to provide visibility to the operator while driving the mixer vehicle 10, operating a main chute 46, and completing other tasks. The front bumper 158 can be affixed to a bottom portion of the housing 70. In some embodiments, the front bumper 158 can be affixed to the frame 28 at the front end 22 of the mixer vehicle 10.

A control assembly 76 can be disposed within the cab 18 and can be configured to control one or more components of the mixer vehicle 10. The control assembly 76 can include controls, buttons, joysticks, and other features that control the movement and orientation of the mixer vehicle 10, the hopper assembly 8, the main chute 46, a charge hopper 42, a discharge hopper 44, the mixing drum 14, and/or other components of the mixer vehicle 10. For example, the control assembly 76 can include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 can include a user interface with a display and an operator input. The display can be configured to display a graphical user interface, an image, an icon, or still other information. In one embodiment, the display can include a graphical user interface configured to provide general information about the mixer vehicle 10 (e.g., vehicle speed, fuel level, warning lights, etc.). The graphical user interface can also be configured to display a current mode of operation, various potential modes of operation, or still other information relating to a transmission, modules, modes of operation, the drive system 20, and/or other components of the mixer vehicle 10.

An air tank 96 can be coupled to and supported by the chassis 12 and positioned directly beneath the mixing drum 14. The air tank 96 can be configured to store compressed air (e.g., for use in an air brake system, for use when raising and lowering a pusher axle assembly, etc.). A water tank 90 can extend laterally across the length of the chassis 12, forward of the air tank 96. The water tank 90 can be coupled to the frame rails 40 and positioned beneath the mixing drum 14. The water tank 90 can be used to supply water to wash the mixer vehicle 10 after pouring a concrete load and/or to add water to the concrete within the mixing drum 14 at the construction site and/or during transit, among other uses.

The drum assembly 6 can be configured to store, mix and dispense concrete. The drum assembly 6 can include the mixing drum 14, a drum driver 114, and the hopper assembly 8. The mixing drum 14 can extend longitudinally along a majority of the length of mixer vehicle 10 and can be angled relative to the frame rails 40 (e.g., when viewed from the side of mixer vehicle 10). The mixing drum 14 can have a first end 36 that is positioned toward the front end 22 of the mixer vehicle 10 and coupled to the front pedestal 16 (e.g., support post, support column, etc.). The first end 36 can at least partially extend over the cab 18. The first end 36 can define a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 can have a second end 38 that is positioned toward the rear end 24 of the mixer vehicle 10 and coupled to the rear pedestal 26 (e.g., support post, support column, etc.). The mixing drum 14 can be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 can be a part of a superstructure of the mixer vehicle 10. The superstructure can further include the frame 28 and the chassis 12. In other embodiments, the mixing drum 14 can be otherwise coupled to the frame rails 40.

In another embodiment, the mixer vehicle 10 can include a drum assembly 6 having a different discharge arrangement. For example, the mixer vehicle 10 can include a rear discharge. A rear discharge mixer vehicle 10 can have the mixing drum 14 with the first end 36 positioned toward the rear end 24 of the mixer vehicle 10 and coupled with the rear pedestal 26. The first end 36 can define the drum opening 72 in communication with the hopper assembly 8 through which concrete can flow. In some embodiments, the mixer vehicle 10 can include a ladder 98 that extends down from the side of the hopper assembly 8 to provide access to the first end 36 of the mixing drum 14. The mixing drum 14 can have the second end 38 positioned toward the front end 22 of the mixer vehicle 10 and coupled with the front pedestal 16.

The front pedestal 16 can include an upper portion 152 and a lower portion 154. The upper portion 152 can be coupled to and supports the hopper assembly 8. The lower portion 154 can be coupled to the frame rails 40 and support the upper portion 152 of the front pedestal 16 and the first end 36 of the mixing drum 14. The rear pedestal 26 can include an upper portion 162 and a lower portion 164. The lower portion 164 can be coupled to the frame rails 40 and support the upper portion 162. The upper portion 162 can support a bottom interface of a drum drive transmission 140 (e.g., a bottom portion of the housing thereof) and/or the second end 38 of the mixing drum 14. In some embodiments, the rear pedestal 26 can include a pair of legs extending between the frame rails 40 and the drum drive transmission 140.

The drum opening 72 at the first end 36 of the mixing drum 14 can be configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 can include a mixing element (e.g., fins, etc.) positioned within the internal volume 30. The mixing element can be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the mixer vehicle 10, the mixing elements of the mixing drum 14 can be configured to agitate the contents of a mixture located within the internal volume 30 of the mixing drum 14 as the mixing drum 14 is rotated in a counterclockwise and/or a clockwise direction by the drum driver 114.

The drum driver 114 can be configured to provide an input (e.g., a torque, etc.) to the mixing drum 14 to rotate the mixing drum 14 relative to the chassis 12. The drum driver 114 can be configured to selectively rotate the mixing drum 14 clockwise or counterclockwise, depending on the mode of operation of the mixer vehicle 10 (i.e., whether concrete is being mixed or dispensed). The drum driver 114 can be coupled to a rear or base portion of the second end 38 of the mixing drum 14 and a top end of the lower portion 164 and/or a lower end of the upper portion 162 of the rear pedestal 26. The drum driver 114 can include a transmission, shown as drum drive transmission 140, and a driver, shown as drum drive motor 130, coupled to drum drive transmission 140. The drum drive transmission 140 can extend rearward (e.g., toward the rear end 24 of the mixer vehicle 10, toward the engine module 110, etc.) from the second end 38 of mixing drum 14 and the drum drive motor 130 can extend rearward from drum drive transmission 140. In some embodiments, the drum drive motor 130 can be a hydraulic motor. In other embodiments, the drum drive motor 130 can be another type of actuator (e.g., an electric motor, etc.). The drum drive motor 130 can be configured to provide an output torque to the drum drive transmission 140, according to an exemplary embodiment, which rotates the mixing drum 14 about a rotation axis. The drum drive transmission 140 can include a plurality of gears (e.g., a planetary gear reduction set, etc.) configured to increase the turning torque applied to the mixing drum 14, according to an exemplary embodiment. The plurality of gears can be disposed within a housing. In some embodiments, a drum drive pump and/or accessory pump can be configured to receive rotational mechanical energy and output a flow of pressurized hydraulic fluid to drive one or more components of the mixer vehicle 10.

The hopper assembly 8 can be positioned at the drum opening 72 of the mixing drum 14. The hopper assembly 8 can be configured to introduce materials into and allow the materials to flow out of the internal volume 30 of the mixing drum 14 of the mixer vehicle 10. The hopper assembly 8 can be configured to prevent loss of material or spillage when the material enters and exits the mixing drum 14. The hopper assembly 8 can include the charge hopper 42, the discharge hopper 44, a hopper actuator 66, a platform 54, and the main chute 46, which, in a front discharge mixer vehicle 10, can be positioned above and at least partially forward of the cab 18 of the mixer vehicle 10. The charge hopper 42 can be configured to direct the materials (e.g., cement precursor materials, etc.) into the drum opening 72 of the mixing drum 14. The discharge hopper 44 can be configured to dispense mixed concrete from the internal volume 30 of the mixing drum 14 to the main chute 46 and, ultimately, the desired location.

The platform 54 can include a perforated surface that surrounds the charge hopper 42 and the discharge hopper 44. In some embodiments, the platform 54 can include an asymmetric base. The platform 54 can include platform sides extending beneath the perforated surface. A guardrail

56 can be coupled to the platform 54 and can follow the contour of a periphery of the platform 54. The platform 54 can be situated at a position near the drum opening 72 of the mixing drum 14 to facilitate access by the operator to the drum opening 72, the internal volume 30, the charge hopper 42, the discharge hopper 44, and/or the main chute 46. In some embodiments, the mixer vehicle 10 can include a ladder 98 that extends downward from a side of the platform 54 to allow an operator to climb and reach the platform 54.

The charge hopper 42 can include a first portion 52 that can be configured to receive materials during a charging/loading operation. The first portion 52 can have a rim 58 (e.g., opening) formed at a free end of the first portion 52. The charge hopper 42 can include a second portion 53 aligned with the bottom of the first portion 52. According to an exemplary embodiment, the charge hopper 42 can be selectively repositionable/movable. In some embodiments, the charge hopper 42 can be configured to rotate about a horizontal, lateral axis. In some embodiments, the charge hopper 42 can be configured to raise and lower vertically. Specifically, the charge hopper 42 can be configured to lift, pivot, or otherwise move between a first position (e.g., a lowered position, loading position, a charging position, etc.) and a second position (e.g., a raised position, a dispensing/discharging position, a pivoted position, etc.) above or shifted from the first position. In the first position, the charge hopper 42 can be configured to direct material (e.g., concrete, etc.) from a source positioned above the mixer vehicle 10 (e.g., a batch plant, etc.) through the drum opening 72 and into the internal volume 30 of the mixing drum 14. The first position can also facilitate transport of the mixer vehicle 10 by lowering the overall height of the mixer vehicle 10. In the second position, the charge hopper 42 can move (e.g., lifts, pivots, etc.) away from the drum opening 72 and facilitate material flowing unobstructed out of the drum opening 72 and into the discharge hopper 44 and the main chute 46.

A hopper actuator 66 can be positioned to move the charge hopper 42 between the first position and the second position. The hopper actuator 66 can facilitate selectively controlling movement of the charge hopper 42 between the first position and the second position. The hopper actuator 66 can be coupled to and extend between the charge hopper 42 and the platform 54. In some embodiments, the hopper actuator 66 can be a hydraulic cylinder. In other embodiments, the hopper actuator 66 can be another type of actuators (e.g., a pneumatic cylinder, a lead screw driven by an electric motor, an electric motor, etc.).

When receiving the material, the charge hopper 42 can be in the first position and the main chute 46 can be in a first configuration (e.g., a transport configuration, a stored configuration, etc.). Accordingly, material can be deposited into the charge hopper 42, and the charge hopper 42 can direct the material into the internal volume 30 of the mixing drum 14 through the drum opening 72. While material is being added to the mixing drum 14, the drum driver 114 can be operated to drive the mixing drum 14 to agitate the material and facilitate fully loading/packing the mixing drum 14. Alternatively, the mixing drum 14 can be stationary while material is added to the mixing drum 14. When discharging and the charge hopper 42 is in the second position, the discharge hopper 44 can funnel material from the mixing drum 14 into the main chute 46.

The main chute 46 can function as an outlet of the mixing drum 14 and can be used to direct concrete dispensed from the internal volume 30 of the mixing drum 14 and through the discharge hopper 44 to a target location near the mixer vehicle 10. The main chute 46 can be pivotally coupled to the platform 54 and/or the discharge hopper 44 such that the main chute 46 can be configured to rotate about both a vertical axis and a horizontal axis. The main chute 46 can include a base section 124 that can be pivotally coupled to the platform 54 and/or the discharge hopper 44. An extension chute 48 (e.g., a folding section, a second chute section, etc.) can be pivotally coupled to the distal end of the base section 124. In some embodiments, a plurality of extension chutes 48 can be pivotally connected to one another. One or more removable/detachable extension chutes 68 can be selectively coupled to the distal end of the extension chute 48. The main chute 46 can be selectively reconfigurable between a first configuration (e.g., a storage configuration, a transport configuration, etc.) and a second configuration (e.g., a use configuration, a dispensing configuration, etc.). In the first configuration, (i) the base section 124 can be selectively oriented substantially horizontal and extending laterally outward, (ii) the extension chute 48 can be selectively pivoted relative to the base section 124 and extending substantially vertically, and (iii) the removable extension chutes 68 can be removed from the extension chute 48 and stored elsewhere in the mixer vehicle 10 (e.g., coupled to the chassis 12 beneath the mixing drum 14, etc.). In the first configuration, the main chute 46 can, therefore, minimally obscure the view of an operator positioned within the cab 18 of a front discharge mixer vehicle 10. In the second configuration, (i) the extension chute 48 can be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 can be coupled to the distal end of the extension chute 48 to increase the length of the main chute 46 (e.g., to distribute concrete further away from the mixer vehicle 10, etc.).

A first chute actuator 122 (e.g., a chute raising/lowering actuator, etc.) can be coupled to and extend between the main chute 46 (e.g., a distal end thereof, etc.) and the chassis 12. In some embodiments, the first chute actuator 122 can extend between the main chute 46 and the front bumper 158. The first chute actuator 122 can be configured to raise and lower the main chute 46 to control the orientation of the main chute 46 relative to a horizontal plane (e.g., the ground, etc.). In some embodiments, the first chute actuator 122 can be a pair of opposing hydraulic cylinders. In other embodiments, the first chute actuator 122 can be another type of actuator (e.g., a pneumatic cylinder, a lead screw driven by an electric motor, a single hydraulic cylinder, etc.). In some embodiments, the first chute actuator 122 and the main chute 46 can both be configured to rotate about the same or substantially the same vertical axis (e.g., as the main chute 46 is pivoted about the vertical axis as described in more detail herein).

A second chute actuator 94 (e.g., a chute pivot/rotation actuator, etc.) can be coupled to the base section 124 of the main chute 46 and the platform 54. The second chute actuator 94 can be configured to rotate the main chute 46 about a vertical axis. The second chute actuator 94 can be configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 can be a hydraulic motor. In other embodiments, the second chute actuator 94 can be another type of actuator (e.g., a pneumatic motor, an electric motor, etc.).

A third chute actuator 78 (e.g., a chute folding/unfolding actuator, etc.) can be configured to reposition (e.g., extend and retract, fold and unfold, etc.) the extension chute 48 relative to the base section 124 of the main chute 46. The third chute actuators 78 can be coupled to and extend between the base section 124 and the extension chute 48. In some embodiments, the third chute actuator 78 can include a plurality of actuators positioned to reposition a first extension chute 48 relative to the base section 124 and one or more second extension chutes 48 relative to the first extension chute 48. The first chute actuator 122, the second chute actuator 94, and the third chute actuator 78 can facilitate selectively reconfiguring the main chute 46 between the first configuration and the second configuration. In some embodiments, a controller can be configured to facilitate providing commands to control operation of the first chute actuator 122, the second chute actuator 94, and the third chute actuator 78 to direct the main chute 46 and concrete flow therefrom. In some embodiments, a hopper pump can be coupled to the chassis 12 and configured to provide pressurized hydraulic fluid to power the first chute actuator 122, the second chute actuator 94, and/or the third chute actuator 78. The hopper pump can be a variable displacement pump or a fixed displacement pump. Additionally or alternatively, a pneumatic pump and/or an electrical storage and/or generation device can be used to power one or more of the first chute actuator 122, the second chute actuator 94, and/or the third chute actuator 78.

Once at the job site, the mixer vehicle 10 can be configured to dispense the material to a desired location (e.g., into a form, onto the ground, etc.). The charge hopper 42 can be repositioned into the second position from the first position by the hopper actuator 66. The extension chute(s) 48 can be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator system can control the drum driver 114 to rotate the mixing drum 14 in the second direction, expelling the material through the drum opening 72, into the discharge hopper 44, and into the main chute 46. The operator can control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the mixer vehicle 10. As described later, the actions taken by the operator (e.g., controlling the chute actuators 122, 94, the drum driver 114, and the speed of rotation of the mixing drum 14) can also be performed by the autonomous control system described herein.

The drive system 20 can be configured to propel the mixer vehicle 10 and can drive other systems of the mixer vehicle 10 (e.g., the drum driver 114, etc.). The drive system 20 can include driven tractive assemblies that include a front axle assembly 132 and a pair of rear axle assemblies 134, each coupled to various wheels 4. In some embodiments, the drive system 20 can include a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the mixer vehicle 10. In some embodiments, a pusher axle assembly 168 (e.g., tag axle assembly, etc.) can be configured to be raised and lowered to selectively engage the support surface (e.g., based on the loading of the mixer vehicle 10, etc.). Such a configuration distributes the pressure exerted on the ground by the mixer vehicle 10, which may be required, for example, when traveling through certain municipalities under load.

The power plant module 62 (e.g., prime mover module, driver module, etc.) can be configured to supply rotational mechanical energy to drive the mixer vehicle 10. The power plant module 62 can be coupled to the chassis 12 and positioned near the longitudinal center of the mixer vehicle 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device can be integrated into a single device (e.g., an electromechanical infinitely variable transmission, an electromechanical transmission, etc.). The electromagnetic device can be configured to provide a mechanical energy input to the transmission. By way of example, the electromagnetic device can be configured to supply a rotational mechanical energy input to the transmission (e.g., using electrical energy generated from the mechanical power input provided by the engine module 110, etc.). In some embodiments, the power plant module 62 and/or the drive system 20 can include additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 can be configured to provide fuel to the engine module 110 and/or other components of the mixer vehicle 10. Specifically, the fuel system 108 can be configured to provide fuel to an engine 74 of the engine module 110. The engine 74 can use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 can include one or more valves, hoses, regulators, filters, and/or various other components configured to facilitate providing fuel to the engine 74. The fuel system 108 can include a container 126 (e.g., a vessel, reservoir, tank, etc.) that is configured to store a fluid (e.g., fuel, air, hydraulic fluid, etc.). The container 126 can be disposed behind the drum driver 114 along the chassis 12. In other embodiments, the container 126 can be coupled to a side of the rear pedestal 26. In some embodiments, the container 126 can be coupled to the chassis 12 and positioned directly beneath the mixing drum 14. According to an exemplary embodiment, the container 126 can include a fuel tank that stores fuel used to power the engine 74. In some embodiments, the container 126 additionally or alternatively can include an air tank configured to store compressed air (e.g., for use in an air brake system, for use when raising and lowering the pusher axle assembly 168, etc.). In some embodiments, the container 126 additionally or alternatively can include a hydraulic tank configured to store hydraulic fluid for use in one or more hydraulic circuits (e.g., a hydraulic circuit that includes the drum driver 114, etc.).

A cover assembly 120 including a plurality of cover panels can be positioned between the second end 38 of the mixing drum 14 and the engine module 110. The cover assembly 120 can be disposed around the fuel system 108 (e.g., the container 126, etc.), the drum driver 114, and the rear pedestal 26. The cover assembly 120 can be configured to protect the various internal components from debris. Such debris can be encountered while the mixer vehicle 10 is driven along a roadway, for example. The cover assembly 120 can also protect the various internal components from damage due to collisions with trees, poles, or other structures at a jobsite or while transporting concrete. In some embodiments, all or some of the fuel system 108 can be incorporated under a hood 86 of the engine module 110.

The engine module 110 can be coupled to the frame rails 40 proximate the rear end 24 of the chassis 12. The engine module 110 can be configured to directly, or indirectly, supply the various components of the mixer vehicle 10 with the power needed to operate the mixer vehicle 10. By way of example, the engine module 110 can be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 can be defined by any number of different types of power sources. According to an exemplary embodiment, the engine module 110 can include the engine 74 coupled to the frame rails 40 and disposed within the hood 86. The engine 74 can include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 can be electrically driven (i.e., powered using electrical energy) rather than hydraulically driven.

In some embodiments, the engine module 110 additionally or alternatively can include multiple battery modules (e.g., batteries, capacitors, ultra-capacitors, etc.) spread throughout the mixer vehicle 10, which can cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the mixer vehicle 10 can be a purely electric vehicle that does not include an internal combustion engine and, as such, can be driven by electrical energy in all modes of operation. In such embodiments, the mixer vehicle 10 cannot include a fuel tank.

Figure 4:
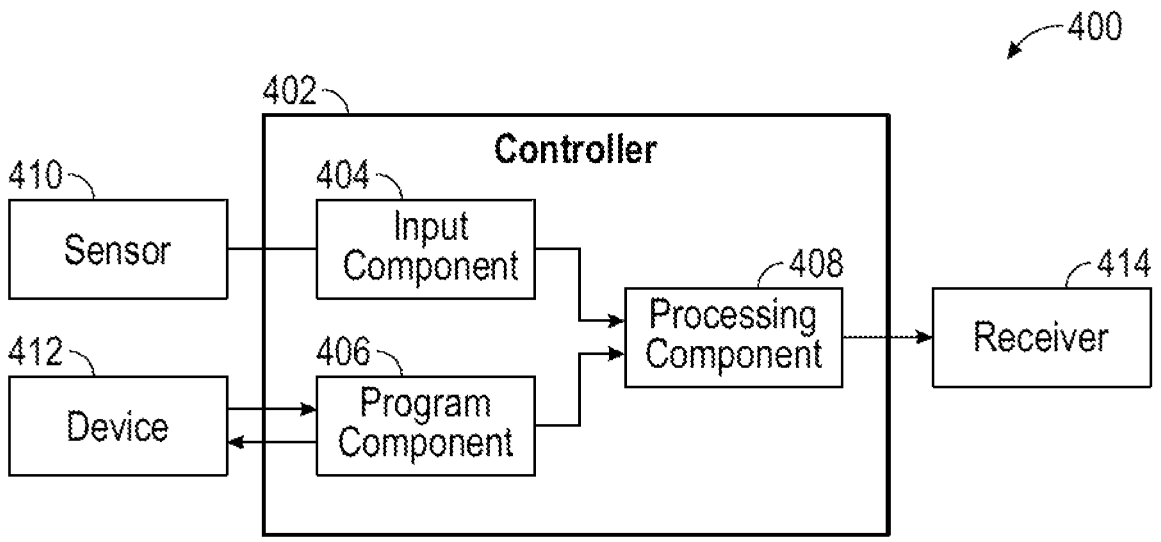
FIG. 4 is a schematic illustration of an autonomous control system for use in the operation of a mixer vehicle, according to an example embodiment.

According to an exemplary embodiment, as shown in FIG. 4, an autonomous control system 400 can be used in the operation of a mixer vehicle 10. The autonomous control system 400 can be configured to automate at least one operation of the mixer vehicle 10. For example, an operation of the mixer vehicle 10 can include any task typically performed by an operator of the mixer vehicle 10 including moving any component of a mixer vehicle 10 (e.g., a chute 46, extension chute 48, mixing drum 14, charge hopper 42, drum driver 114), turning on or turning off any mode of operation (e.g., auto-load mode, mixing mode, constant speed mode), among others. For example, when filling a mixing drum 14 of a mixer vehicle 10, the operator of the mixer vehicle 10 typically has to manually activate a mixing mode of operation (e.g., flip a switch, press a button, pull a trigger) to activate the drum driver 114 to make the mixing drum 14 rotate when the volume of mixture ingredients in the mixing drum 14 is at the desired amount (or as it is being filled). The autonomous control system 400 can, instead, sense when the mixing drum 14 reaches the desired volume and can automatically actuate the mixing mode of operation. For example, the autonomous control system 400 can sense the weight of the mixing drum 14 or the volume of the mixture ingredients in the mixing drum 14, and once the weight or the volume reaches a predetermined threshold value, the autonomous control system 400 can activate the mixing mode of operation. In another example, when pouring the cement from the mixing drum 14 through the chutes 48 onto the desired location, an operator of the mixer vehicle 10 typically has to manually stop the dispensing of the cement (e.g., deactivate the dispense mode of operation, close the drum opening 72, change direction of rotation of the mixing drum 14). The autonomous control system 400 can, instead, sense when a predetermined amount of the cement has been dispensed and can automatically stop the dispensing of the cement. For example, the autonomous control system 400 can sense the weight of the mixing drum 14 or can detect a hand signal from the operator (e.g., operator can create an "X" with their arms), and once a predetermined threshold weight is reached or the threshold hand signal is detected, the autonomous control system 400 can deactivate the dispensing of the cement.

The autonomous control system 400 can be used with other types of vehicles (e.g., refuse vehicles) and can be configured to control any mode of operation of the vehicle, any subcomponent of the vehicle, and any combination thereof. For example, the autonomous control system 400 can activate or deactivate any mode of operation including, but not limited to, an auto-load mode of operation (e.g., move subcomponents into a loading position), a mixing mode of operation (e.g., start or stop rotation of a mixing drum 14), a constant speed mode of operation (e.g., control rotation of mixing drum), etc. In another example, the autonomous control system 400 can move any of the subcomponents of the vehicle to desired positions (e.g., move chutes 46 from a storage/transport position to a dispensing position). In another example, the autonomous control system 400 can provide an alert to an operator of the vehicle. For example, the autonomous control system 400 can sound an alarm or turn on or off lights when activating or deactivating modes of operation (e.g., when switching from mixing mode to constant speed mode), when moving subcomponents (e.g., when moving chutes 46 into a dispensing position), when an automated task is complete (e.g., when the chutes 46 are done moving), etc.

According to an exemplary embodiment, the autonomous control system 400 can include at least one controller 402 and at least one sensor 410. The controller 402 can be configured to receive at least one input from at least one source (e.g., the sensor 110), compare the input to a threshold, and generate at least one output corresponding to the threshold responsive to receipt of the input. The threshold can be a parameter with a predetermined value that needs to be met before the autonomous control system 400 can control an operation of the mixer vehicle 10. For example, the parameter can be a location and the predetermined value can be a specific address, the parameter can be a weight and the predetermined value can be a specific number, and the parameter can be a hand signal and the predetermined value can be a specific orientation of arms or hands of an operator. The output can comprise the automation of at least one operation of the mixer vehicle 10 that corresponds to a threshold. For example, the output can comprise at least one of moving at least one subcomponent of the mixer vehicle 10 to a desired position, activating or deactivating at least one mode of operation of the mixer vehicle 10, and providing an alert to an operator of the mixer vehicle 10. The controller 402 can be used with any variation of a mixer vehicle 10. The controller 402 can include at least one input component 404, at least one program component 406, and at least one processing component 408. In general, the input component 404 can be configured to receive input signals from the sensor 410. The input signals can indicate an event. The program component 406 can be configured to receive and store instructions from at least one device 412. The device 412 can be communicably coupled with the controller 402 via the program component 406. The instructions can indicate a threshold and a corresponding output. The processing component 408 can be configured to compare the event indicated by the input signal received by the input component 404 from the sensor 410 with the threshold received by the program component 406 by the device 412. If the event satisfies the threshold, the processing component 408 can be configured to generate the corresponding output to the threshold and to send the output to at least one receiver 414.

According to an exemplary embodiment, the input component 404 can be configured to receive an input signal from the sensor 410. The sensor 410 can be any type of sensor configured to detect an event. For example, an event can include a location, a temperature, a volume, a speed, a movement, a hand gesture, a sign, among other things. The sensor 410 can be any device capable of detecting the event (e.g., camera, motion sensor, global positioning system (GPS), thermometer, scale) and generating an input signal to be received by the controller 402 via the input component 404. The input signal can indicate the event detected by the sensor 410. The sensor 410 can be communicably coupled with the controller 402 by either a physical connection (e.g., wired) or a wireless connection (e.g., over a network, Bluetooth connection). The sensor 410 can be coupled with the mixer vehicle 10 and any subcomponent thereof. For example, if the sensor 410 is configured to sense the volume of mixture ingredients in the mixing drum 14, the sensor 410 can be disposed inside the mixing drum 14 and can measure the amount of the mixing ingredients within the mixing drum 14. In another example, if the sensor 410 is configured to determine when a mixing truck is at a concrete plant, the sensor 410 can be a GPS disposed in the cab 18 of the mixer vehicle 10. In another example, the sensor 410 can be configured to interpret visual cues such as signs, symbols, and hand gestures, among others. The sensor 410 can be a motion sensor or a camera coupled to the exterior of the mixer vehicle 10 such that it can detect hand gestures made by an operator outside the mixer vehicle 10. The sensor 410 can be coupled with any subcomponent of the mixer vehicle 10 based, in part, on what event the sensor 410 is configured to detect.

According to an exemplary embodiment, the program component 406 can be configured to receive instructions and retrievably store said instructions such that a user of a device 412 (e.g., an operator of a mixer vehicle 10) can view, update, or select the instructions periodically. The instructions can include at least one threshold and at least one corresponding output. For example, the program component 406 can receive the instructions from the device 412. The device 412 can be any mechanism capable of communicating with, transmitting information to, and receiving information from the controller (e.g., a computer, smart phone). The device 412 can provide a user with means to input, view, or change instructions and thereby determine the threshold(s) and the corresponding output(s). For example, the device 412 can include a user interface wherein information and interaction points (e.g., buttons, text fields) for user input can be displayed. The interaction points can be either incorporated in the user interface (e.g., touch screen buttons) or can be physical elements (e.g., physical buttons) on the device 412. The user of the device 412 can be, for example, a manufacturer or an operator of a mixer vehicle 10.

The instructions provided by the user of the device 412 to the program component 406 can dictate when the controller 402 can generate an output and what that output can be. For example, the instructions can indicate a threshold and a corresponding output. When the threshold is met, the controller 402 can generate the corresponding output. For example, the threshold can be a location (e.g., at a cement factory) such that when the mixer vehicle 10 is at the location (i.e., the threshold is met), the controller 402 can be configured to generate a specific output (e.g., activate an auto-fill mode of operation). Other examples of thresholds can include, but are not limited to, temperature of mixture ingredients, volume of mixture ingredients, time lapsed, changes in hydraulic pressure, hand gestures, etc.

According to an exemplary embodiment, the device 412 can be configured to allow a user to determine what the thresholds are. For example, the user can input thresholds, view thresholds, update thresholds, disable thresholds, remove thresholds, etc. For example, the user of the device 412 can see all instructions and programs already stored in the program component 406. For example, the user of the device 412 can see that the controller 402 has instructions causing the controller 402 to initiate a mixing mode of operation when the mixing drum 14 is 100% full with mixture ingredients. The user of the device 412 can also change those instructions. For example, if an operator of the mixer vehicle 10 needs less mixture ingredients for another job, the operator, via the device 412, can change the threshold from 100% full to 50% full. Therefore, instead of the controller 402 initiating the mixing mode of operation when the mixing drum 14 is 100% full, the controller 402 can initiate the mixing mode of operation when the mixing drum 14 is only 50% full. The program component 406 can include only one set of instructions, or can include a plurality of instructions. The plurality of instructions can all relate to different events, can all relate to the same event, or a mixture thereof. For example, the controller 402 can be configured to generate three different outputs when a single detected event reaches a threshold. In another example, the controller 402 can be configured to generate three different outputs, each output corresponding to a different event reaching a different threshold.

According to an exemplary embodiment, the processing component 408 can be configured to determine when a threshold is reached and when an output can be generated. For example, the processing component 408 can compare the input received by the input component 404 with the instructions received by the program component 406. The input can indicate an event and the instructions can indicate a threshold and a corresponding output. When the processing component determines the event detected by the sensor 410 satisfies the threshold stored in the program component 406, the processing component 408 can generate the corresponding output. The output can include at least one operation of the mixer vehicle 10 to be sent to at least one receiver 414. The receiver 414 can be any subcomponent of the mixer vehicle 10 capable of executing the output (e.g. the first, second, or third chute actuator 122, 94, 78, the hopper actuator 66, the drum driver 114). For example, the threshold in the instructions can be the location of a jobsite (e.g., where cement is being transported to), and the corresponding output can be to unlock the chutes 48 of the mixer vehicle 10, allowing the chute 46 to function. The output can go even further and include moving the chute 46 to a position such that an end of the chute 46 is disposed over a desired location such that the mixture ingredients, when dispensed through the chute 46, are directed toward the desired location. The mixer vehicle 10 can have a sensor 410 that can detect the location of the mixer vehicle 10 (e.g., a GPS). When the mixer vehicle 10 arrives at the jobsite, the sensor 410 can be configured to detect the location and send an input signal to the controller 402 indicating the mixer vehicle 10 is at the jobsite. The processing component 408 can be configured to compare the location of the mixer vehicle 10 with the threshold location. If the processing component 408 determines the location of the mixer vehicle 10 matches the threshold location, the processing component 408 can generate the output corresponding to the threshold. For example, the corresponding output to arriving at the jobsite can be to unlock the chutes 46 of the mixer vehicle 10 and to move the chutes 46 from a transport position to a dispensing position. The output can be sent to a plurality of receivers. A first receiver being a locking mechanism of the chutes 46 (e.g., to unlock the chute 46) and a second receiver being a chute actuator 122 (e.g., to move the chute 46 into the dispensing position).

According to an exemplary embodiment, the controller 402 can be located anywhere as long as the controller 402 can receive inputs from the sensors 410 and the controller 402 can transmit outputs to the receivers 414. For example, the controller 402 can be located on or within the mixer vehicle 10. In another example, the controller 402 can be located at a remote location (e.g., server room). As long as information can be transmitted via a wireless connection (e.g., network, Bluetooth) the controller 402 can be disposed at any location.

As described herein, the autonomous control system 400 can be configured to automate a variety of operations typically performed by operators of a mixer vehicle 10. One example can include positioning the chute 46. For example, the operator of the mixer vehicle 10 typically manually adjusts the height, direction, or angle of the chute by physically grabbing and moving the chute, by moving a joystick, etc. With the autonomous control system 400, the sensor 410 can detect a plurality of hand gestures made by the operator of the mixer vehicle 10. Each hand gesture can be an event and can be compared to a threshold stored in the program component 406. If the hand gesture matches the threshold, the processing component 408 can generate an output to move the chute 46 accordingly. For example, a first hand gesture can include the operator pointing in a first direction (e.g., to the left). The autonomous control system 400 can be configured to generate a first output based on the first hand gesture. The first output can include moving the chute 46 in the first direction. A second hand gesture can include the operator making a fist. The autonomous control system 400 can be configured to generate a second output based on the second hand gesture. The second output can include stopping the movement of the chute 46. The instructions stored in the program component 406 can be changed such that any hand gesture can be modified to generate a different output.

According to an exemplary embodiment, the autonomous control system 400 can be configured to automate at least one operation of the mixer vehicle 10 based on a selected level of autonomy. For example, the autonomous control system 400 can adjust between different levels of autonomy based on different situations. The autonomous control system 400 can have an on setting (e.g., detects events and generates outputs when thresholds are met), an off setting (e.g., can be completely shut off—requiring an operator to turn back on, can still be detecting event, but cannot generate any outputs), and at least one intermediate setting (e.g., can generate some outputs, but not all). For example, the level of autonomy can be adjusted based on location, vehicle behavior, etc. Regarding location, for example, if the mixer vehicle 10 is in a location where extra precision and caution is required, the sensor 410 can detect the location and send an input signal indicating the location to the input component 404. The location can match a location threshold stored in the program component 406 and the processing component 408 can generate an output to shut off, or at least temporarily inhibit, the autonomous control system 400 such that any switching between modes of operation or movement of the subcomponents of the mixer vehicle 10 can only be done manually. An example of an intermediate setting can include the operator having to manually select a mode of operation (e.g., via the device 412 or a button in the mixer vehicle 10), then the autonomous control system 400 can cause all relevant subcomponents to move, activate, deactivate accordingly. For example, when at a jobsite and it is time to dispense the concrete from the mixing drum 14, instead of the operator unlocking the chutes 46, positioning the chutes 46 over the desired location, and reversing the rotation of the mixing drum 14, the intermediate mode of the autonomous control system 400 can allow the operator to select a button (e.g., on the device, in or on the mixer vehicle 10) indicating a dispensing mode of operation, and the autonomous control system 400 can cause the chutes 46 to unlock, move to the desired position, and reverse the rotation of the mixing drum 14. Alternatively, in the fully autonomous mode, the autonomous control system 400 would detect the location of the mixer vehicle 10 being at the jobsite and automatically initiate the dispensing mode of operation without the operator doing anything.

Regarding vehicle behavior, for example, if the mixer vehicle 10 performs a certain act or malfunctions in some way, the level of autonomy can be adjusted accordingly. For example, if a sensor 410 detects too much vibration or too much heat coming from a particular part of the mixer vehicle 10, the autonomous control system 400 can be shut off (i.e., enter the off setting). In another example, the autonomous control system 400 can be configured to enter the off setting when the drive system 20 of the mixer vehicle 10 is engaged (e.g., the mixer vehicle 10 is moving). For example, the autonomous control system 400 can be configured to activate an auto-load mode of operation when the mixer vehicle is at a concrete plant. In this example, the autonomous control system 400 can still detect the location of the mixer vehicle 10, but cannot activate the auto-load mode of operation until the mixer vehicle 10 is stopped and the drive system 20 is disengaged. Once disengaged, the autonomous control system 400 can switch from the off setting to the on setting (or an intermediate setting, based on the situation), and can generate outputs accordingly.

Figure 5:
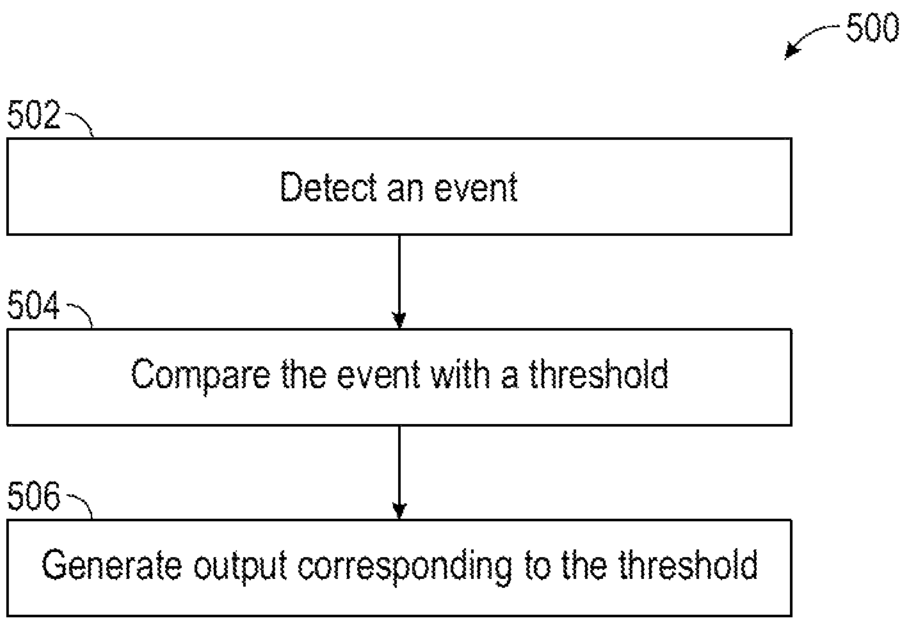
FIG. 5 is a flow diagram of a method of automating the operation of a mixer vehicle, according to an example embodiment.

According to an exemplary embodiment, as shown in FIG. 5, method 500 can automate at least one operation of a mixer vehicle. At operation 502, an autonomous control system 400 can detect an event. At operation 504, the autonomous control system 400 can compare the event with a threshold. At 506, the autonomous control system 400 can generate an output corresponding to the threshold. Operation 502 can include a sensor 410 of the autonomous control system 400 sensing the event. For example, the sensor 410 can be a GPS detecting when a mixer vehicle 10 is at a certain location, a camera detecting when an operator is making a hand gesture, or a gauge measuring the change (or lack thereof) in hydraulic pressure, among others. Operation 502 can also include the sensor 410 sending an input signal to a controller 402 of the autonomous control system 400. The input signal can indicate the event detected. For example, if the event detected is the location of the mixer vehicle 10, the input signal can indicate the location of the mixer vehicle 10 (e.g., an address, longitude/latitude coordinates). If the event detected is the operator pointing their hand in a first direction, the input signal can indicate what the first direction is.

According to an exemplary embodiment, at operation 504 the autonomous control system 400 can compare the event detected at operation 502 with a threshold from a program component 406 of the autonomous control system 400. Operation 504 can also include the program component 406 receiving instructions from a device 412. The instructions can indicate a threshold and a corresponding output. The threshold can be a parameter that needs to be met before the autonomous control system 400 can control an operation of the mixer vehicle. The corresponding output can be an operation the autonomous control system 400 can control once the corresponding threshold is met. For example, the instructions can indicate that the threshold for activating an auto-load mode of operation of the mixer vehicle 10 is that the mixer vehicle 10 has to be located and parked at a concrete plant. The corresponding output to the threshold of the mixer vehicle 10 being located and parked at the concrete plant is to activate the auto-load mode of operation. The threshold and corresponding output included in the instructions can be retrievably stored in the program component 406 such that a user of the device 412 can view, select, and update the instructions periodically. For example, the user of the device 412 can be an operator of the mixer vehicle 10, and the operator can add a threshold, delete a threshold, or change a threshold based on the project the operator is working on. The operator can do the same for corresponding outputs. For example, if the mixer vehicle 10 gets concrete from several concrete plants, the operator can add a threshold to include the address of the second concrete plant such that when parked at the second concrete plant, the autonomous control system 400 can activate the auto-load mode of operation. Regarding the corresponding output, the operator can add a second corresponding output to the initial threshold such that when parked at the first concrete plant, the autonomous control system 400 can activate the auto-load mode of operation and sound an alarm so the operator knows that the auto-load mode of operation has been activated.

According to another exemplary embodiment, the threshold can be a parameter that when met, can adjust the level of autonomy of the autonomous control system 400. For example, the autonomous control system 400 can have an on setting, an off setting, and at least one intermediate setting, as described herein. An example of a threshold for changing the level of autonomy from the on setting to the off setting can be a duration of time of five minutes to reach a certain volume of mixture ingredients in the mixing drum 14. For example, if it takes longer than five minutes to fill the mixing drum 14, that could indicate that the sensors 410 are not working or the charge hopper 42 is not positioned appropriately so the operator needs to make adjustments manually and the autonomous control system 400 can be turned off. An example of a threshold for changing the level of autonomy from the on setting to an intermediate setting can be a specific location. For example, if a certain jobsite requires extra precision or caution, the location of the mixer vehicle 10 can be the threshold such that when the vehicle is at the jobsite, the autonomous control system 400 requires the operator of the mixer vehicle 10 to approve the output generated by the controller 402 (e.g., push a button in the mixer vehicle 10 or on the device 412) before sending the output to the receivers 414.

According to an exemplary embodiment, after the program component has received the instructions, the autonomous control system 400 can compare the event detected with the threshold stored in the program component 406. For example, a processing component 408 of the autonomous control system 400 can determine whether the event reaches or matches the threshold. If the event does not meet the threshold, the autonomous control system 400 cannot move to operation 506 and cannot generate an output. If the event does meet the threshold, the autonomous control system 400 can move to operation 506 and generate the corresponding output. For example, the threshold for the autonomous control system 400 to switch the operation mode of the mixer vehicle 10 from the auto-load mode to a mixing mode can be that the mixing drum 14 of the mixer vehicle 10 must be 100% full. If the sensor 410 detects that the mixing drum 14 is only 80% full, the processing component 408 can compare the 100% threshold with the 80% event and determine that the event does not meet the threshold. Therefore, the autonomous control system 400 cannot generate the output to switch the modes of operation. If the event reaches 100% and the sensor 410 sends an input to the input component 404 indicating the 100% event, then the processing component 408 can determine that the event meets the threshold and the autonomous control system 400 can generate the corresponding output to switch the mode of operation from the auto-load mode to the mixing mode.

According to an exemplary embodiment, at operation 506 the autonomous control system 400 can generate an output corresponding to the threshold that was met at operation 504. The output (e.g., a signal, a command) can be transmitted to at least one receiver 414. The output can include at least one operation of the mixer vehicle 10. The receiver 414 can be the mechanism, or coupled with the mechanism, configured to move the subcomponents of the mixer vehicle 10, to activate or deactivate the modes of operation, and to provide alerts to the operator of the mixer vehicle 10. For example, the receiver 414 can be coupled with an actuator that is configured to move the chute 46 of the mixer vehicle 10 upon receipt of the output. The processing component 408 can generate the output causing the receiver 414 to activate the actuator and move the chute 46.

According to an exemplary embodiment, the autonomous control system 400 can be control any number of operations in any order. For example, a first sensor 410 can detect a first event (e.g., mixer vehicle 10 arriving at a threshold location—a concrete plant) and the controller 402 can generate a first output corresponding to the threshold location (e.g., activating an auto-load mode of operation). While in the auto-load mode of operation, the mixing drum 14 of the mixer vehicle 10 can be filled with concrete. When the mixing drum 14 is full, a second sensor 410 can detect a second event (e.g., the mixing drum 14 containing a threshold amount of concrete) and the controller 402 can generate a second output corresponding to the threshold amount of concrete (e.g., deactivate the auto-load mode of operation and activate the mixing mode of operation). The second event can also cause the controller 402 to generate a third output (e.g., create a sound indicating the mixer vehicle 10 is transitioning from the auto-load mode of operation to the mixing mode of operation). The third output can also correspond to the threshold amount of concrete. Alternatively, a third sensor 410 can detect a third event (e.g., mixing of the concrete reaches a mixing threshold—time/temperature of concrete/viscosity of concrete, etc.) and the controller 402 can generate a third output corresponding to the mixing threshold (e.g., deactivating the mixing mode of operation and activating a constant speed mode of operation).

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, EPROM, EEPROM, or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the autonomous control system as shown in the various exemplary embodiments is illustrative only. Additionally, any element disclosed in one embodiment may be incorporated or utilized with any other embodiment disclosed herein. Although only one example of an element from one embodiment that may be incorporated or utilized in another embodiment has been described above, it should be appreciated that other elements of the various embodiments may be incorporated or utilized with any of the other embodiments disclosed herein.

What is claimed is:

1. A mixer vehicle system, comprising:

a mixer vehicle, comprising:

a chassis supporting a plurality of wheels; and a vehicle body supported by the chassis, wherein the vehicle body comprises a plurality of subcomponents, the plurality of subcomponents comprising:

a cabin configured to house one or more operators of the mixer vehicle;

a mixing drum defining an aperture and an internal volume, wherein the mixing drum is movable relative to the chassis to agitate mixture ingredients stored in the mixing drum;

a charge hopper positioned proximate the aperture, wherein the charge hopper is movable relative to the aperture; and a chute positioned proximate the aperture, beneath the charge hopper, wherein the chute is pivotally coupled to the mixer vehicle; and an autonomous control system configured to automate at least one operation of the mixer vehicle based on a level of autonomy, wherein the autonomous control system automatically adjusts the level of autonomy based on at least one of a location of the mixer vehicle or a behavior of the mixer vehicle, the autonomous control system comprising:

a sensor coupled to an exterior the mixer vehicle, wherein the sensor is a camera, the sensor configured to detect an event outside the mixer vehicle by detecting movement of an operator and generate an input signal indicating the event, wherein the event is a visual cue, wherein the visual cue comprises a hand gesture; and a controller communicably coupled with the sensor, the controller configured to:

receive the input signal generated by the sensor;

compare the event indicated by the input signal with a threshold, the threshold having a corresponding output;

determine the event reaches or matches the threshold; and generate the corresponding output responsive to determining the event satisfies the threshold, the corresponding output comprising the at least one operation of the mixer vehicle, wherein the at least one operation of the mixer vehicle comprises automatically moving at least one of the mixing drum, the charge hopper, or the chute to a desired position based on the hand signal and an instruction corresponding to the threshold.

2. The system of claim 1 wherein the sensor is a first sensor, the event detected by the first sensor is a first event, and the corresponding output generated by the controller is a first output responsive to receipt of a first input signal;

the system further comprising a second sensor, wherein the second sensor detects a second event, the second event being the mixing drum containing a threshold amount of concrete, wherein the controller generates a second output responsive to receipt of a second input signal generated by the second sensor, the second output comprising deactivating the auto-load mode of operation and activating a mixing mode of operation.

3. The system of claim 2, wherein the controller generates a third output responsive to receipt of the second input signal generated by the second sensor, the third output comprising a sound indicating the mixer vehicle is transitioning from the auto-load mode of operation to the mixing mode of operation.

4. The system of claim 2, further comprising a third sensor, wherein the third sensor detects a third event, the third event being the mixing of the threshold amount of concrete reaches a mixing threshold, wherein the controller generates a third output responsive to a third input signal generated by the third sensor, the third output comprising deactivating the mixing mode of operation and activating a constant speed mode of operation.

5. The system of claim 1, wherein the controller comprises an input component, a program component, and a processing component.

6. The system of claim 5, further comprising a device, wherein the device is communicably coupled with the controller;

wherein the controller is configured to receive the instruction from the device via the program component.

7. The system of claim 6, wherein a user of the device can determine the threshold and the corresponding output, wherein the user is the operator of the mixer vehicle.

8. The system of claim 1, further comprising a second sensor that detects a signal from the chassis to automatically actuate the autonomous control system.

9. The system of claim 1, wherein the visual cue comprises a plurality of hand gestures, the plurality of hand gestures including a first hand gesture and a second hand gesture;

wherein the first hand gesture comprises the operator outside of the mixer vehicle pointing in a first direction;

wherein the second hand gesture comprises the operator of the mixer vehicle making a fist;

wherein the controller generates a first output based on the first hand gesture, the first output comprising moving the chute in the first direction; and wherein the controller generates a second output based on the second hand gesture, the second output comprising stopping the chute from moving.

10. The system of claim 1, wherein the level of autonomy comprises at least one of an on setting, an off setting, and an intermediate setting.

* * * * *